: US 8,373,755 B2
(45) Date of Patent: Feb. 12, 2013

(12) United States Patent
Lee

(54) NETWORK CAMERA AND SYSTEM AND METHOD FOR OPERATING THE NETWORK CAMERA AND SYSTEM

(75) Inventor: Young-ki Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 160 days.

(21) Appl. No.: 12/832,371

(22) Filed: Jul. 8, 2010

(65) Prior Publication Data
US 2011/0181729 A1 Jul. 28, 2011

(30) Foreign Application Priority Data

Jan. 28, 2010 (KR) .................. 10-2010-0008041

(51) Int. Cl.
*H04N 7/18* (2006.01)
(52) U.S. Cl. .................. 348/159; 348/169; 382/103

(58) Field of Classification Search .................. 348/159, 348/169; 382/103
See application file for complete search history.

(56) References Cited

U.S. PATENT DOCUMENTS

| 5,995,140 | A  | * | 11/1999 | Cooper et al. | ........ | 348/159 |
| 7,460,781 | B2 | * | 12/2008 | Kanai et al.  | ........ | 396/263 |
| 7,675,478 | B2 | * | 3/2010  | Yamazaki      | ........ | 345/1.1 |
| 7,782,363 | B2 | * | 8/2010  | Ortiz         | ........ | 348/211.8 |
| 7,990,422 | B2 | * | 8/2011  | Ahiska et al. | ........ | 348/218.1 |

FOREIGN PATENT DOCUMENTS

| JP | 11-69305 A    | 3/1999  |
| JP | 2007-318411 A | 12/2007 |

* cited by examiner

*Primary Examiner* — David Lazaro
*Assistant Examiner* — Marie Georges Henry
(74) *Attorney, Agent, or Firm* — Sughrue Mion, PLLC

(57) ABSTRACT

A system for operating network cameras, a method for operating network cameras, and a network camera having a storage function are provided so that the system does not have to include a network video recorder.

23 Claims, 9 Drawing Sheets

NETWORK CAMERA AND SYSTEM AND METHOD FOR OPERATING THE NETWORK CAMERA AND SYSTEM

CROSS-REFERENCE TO RELATED PATENT APPLICATION

This application claims priority from Korean Patent Application No. 10-2010-0008041 filed on Jan. 28, 2010, the disclosure of which is incorporated herein in its entirety by reference.

BACKGROUND

1. Field

Apparatuses and methods consistent with the present inventive concept relate to a network camera and system and a method for operating the same.

2. Description of the Related Art

A network camera is a device for transmitting a captured image to a client device in a wired or wireless manner. The network camera converts a captured image from analog to digital, encodes the digitally converted image, and transmits the encoded image via a wired or wireless network. Network cameras are broadly used to capture images in a security system using a closed circuit television (CCTV).

SUMMARY

According to one or more exemplary embodiments, there are provided a network camera capable of storing captured images and providing a web service to a client device without the use of a network video recorder and a system and a method for operating network cameras.

According to an exemplary embodiment, there is provided a system for operating network cameras, the system including: at least one network camera which generates corresponding image data and is connected to a network; and a storage medium which is connected to a first camera of the at least one network camera and stores the corresponding image data, wherein the first camera generates first image data, and stores in the storage medium and the corresponding image data generated by the at least one network camera, and wherein the first camera is a master camera which receives control signals from a client device connected to the network to control the at least one network camera.

Here, the at least one network camera except the first camera may be a slave camera which generates second image data and transmits the second image data to the first camera. The first camera may include a storage management unit which stores the first and second image data in the storage medium.

The first camera as a master camera can perform an operation of searching for requested image data and providing requested image data to a client. To do this, the first camera may further include a search unit configured to search the storage medium for the requested image data stored in the storage medium and provide the requested image data to the client device in response to a request received from the client device.

The first camera as a master camera can process a setup change request received from a client. To do this, the first camera may further include a setup change unit configured to control one of the at least one network camera to change its setup information in response to a request received from the client device.

The first camera as a master camera can process a real-time image data request received from a client. To do this, the first camera may further include a real-time image providing unit configured to the client device with real-time image data generated by at least one of the first camera and the slave camera, in response to a request received from the client device.

The slave camera transmits the second image generated by the slave camera to the master camera which is the first camera. To do this, the slave camera may include an image data transmission controller configured to transmit the second image data to the first camera.

The slave camera reallocates a new master camera when the first camera, which is the existing master camera, is in an abnormal state. To do this, the slave camera may include: a master state detector which detects a state of the first camera; and an authorization redesignator which designates one of the at least one network camera except the first camera as a new master camera which receives the control signals from the client device to control the at least one network camera if the first camera is determined to be in an abnormal state.

The storage medium may be connected to the first camera and may be at least one of a network attached storage (NAS), a universal serial bus (USB) hard disk device, a secure digital (SD) card, and a flash memory.

The system may further include the client device.

According to another exemplary embodiment, there is provided a method for operating at least one network camera connected to a network. The method may include: designating a first camera of the at least one network camera as a master camera which receives control signals from a client device connected to the network to control the at least one network camera; designating the at least one network camera except the first camera as a slave camera; and storing, by the first camera, first image data generated by the first camera and second image data generated by the slave camera in a storage medium connected to the first camera.

According to still another exemplary embodiment, there is provided a network camera operating as a master camera. The network camera may generate first image data and is connected to a network, the network camera being connected to at least one other network camera generating second image data, a client device via the network, and a storage medium, and may include: a storage management unit which stores the first image data and the second image data in the storage medium; and a search unit which searches the storage medium for requested image data and provides the requested image data to the client device in response to a client request received from the client device.

According to still another exemplary embodiment, there is provided a network camera operating as a slave camera. The network camera may generate image data and may be connected to a master camera and at least one slave camera via a network. The network camera may include an image data transmission controller which transmits the image data to the master network camera. Here, the master network camera may store the image data in a storage medium connected to the master camera Network cameras included in a system for operating network cameras according to still another exemplary embodiment may be configured identically or similarly in terms of hardware and operate as a master camera or a slave camera according to an authorization setup. According to still another exemplary embodiment, the network camera may generate first image data and may be connected to at least one other network camera generating second image data, a client device and a storage medium via a network. The network camera may include: a master block configured to perform a first function including storing the first image data and the second image data in the storage medium, and searching the storage medium for requested image data and providing the requested image data to the client device in response to a request received from the client device; a slave block configured to perform a second function of transmitting the first image data generated by the network camera to one of the at least one other network camera; and an authorization setup unit configured to set the network camera as a master camera or a slave camera, activate the master block if the network camera is set as a master camera to perform the first function, and activate the slave block to perform the second function if the network camera is set as a slave camera.

BRIEF DESCRIPTION OF THE DRAWINGS

The above and other aspects of the present inventive concept will become more apparent by describing in detail exemplary embodiments thereof with reference to the attached drawings, in which.

DETAILED DESCRIPTION OF EXEMPLARY EMBODIMENTS

The detailed description and the attached drawings for illustrating exemplary embodiments are referred to in order to gain a sufficient understanding of the present inventive concept. However, structures that can be easily embodied by those of ordinary skill in the art may not be described.

The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the present inventive concept. The terminology described below must be analyzed accordingly to the meaning and concept matching the technical spirit of the present inventive concept to most properly embody the present inventive concept.

The present inventive concept will now be described more fully with reference to the accompanying drawings, in which exemplary embodiments are shown.

Figure 1:
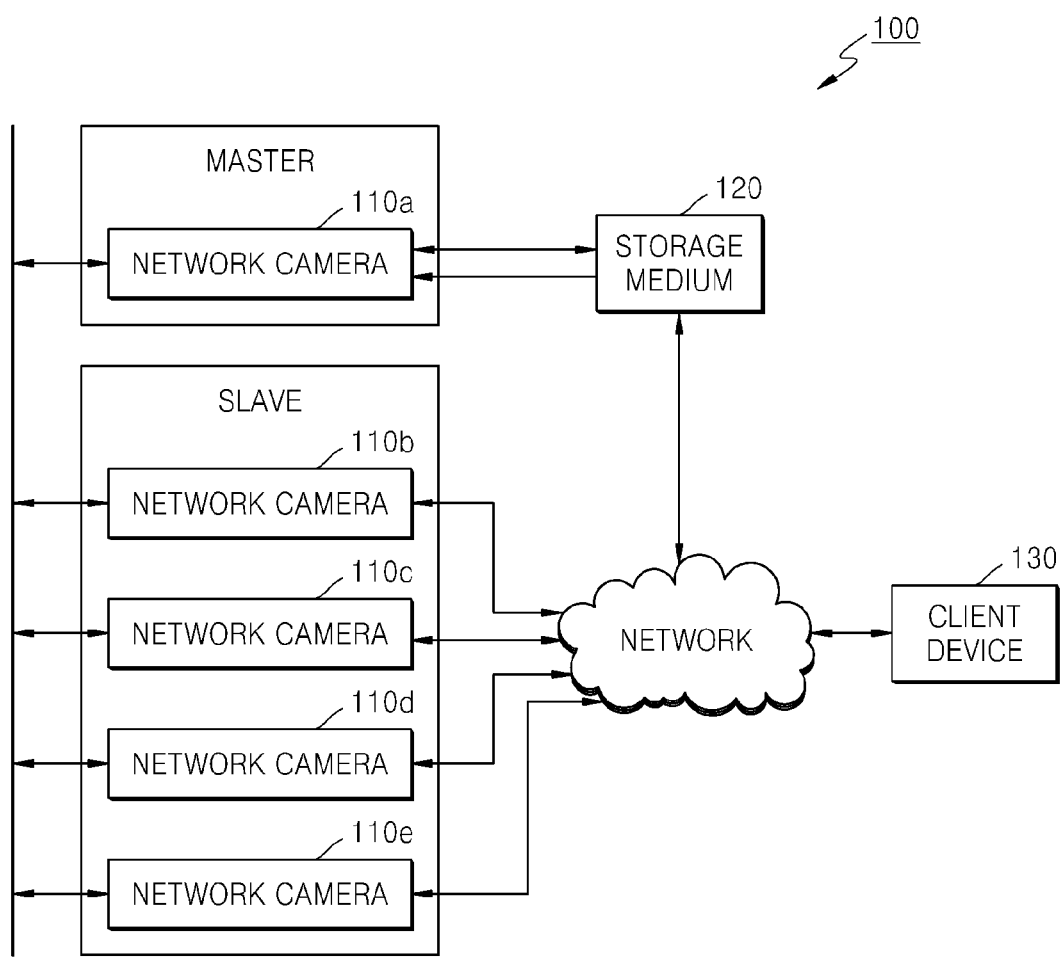
FIG. 1 is a block diagram illustrating a structure of a system for operating network cameras according to an exemplary embodiment.

FIG. 1 is a block diagram illustrating a structure of a system 100 for operating network cameras according to an exemplary embodiment.

The system 100 includes at least one network camera 110a to 110e, a storage medium 120, and a client device 130, which can exchange data and control signals by being connected to one other via a network. Although five network cameras 110a to 110e are shown in FIG. 1, the number of network cameras can be properly selected, and the present inventive concept is not limited to the five network cameras 110a to 110e.

The system 100 does not require a network video recorder which is required in a related art to perform storage and search functions. Instead, the system 100 has storage and search functions in at least one of the network cameras 110a to 110e. In addition, the system 100 has an image data storage function by using only the passive storage medium 120. Accordingly, the system 100 can have a small size and construction costs thereof can be reduced.

Furthermore, according to an exemplary embodiment, by designating the network cameras 110a to 110e as a master camera or a slave camera, respectively, and having the master camera perform functions such as storage, search, and client request processing, the network cameras 110a to 110e can be effectively operated. For example, the network camera 110a can be designated as a master network camera, and the network cameras 110b to 110e can be designated as slave network cameras. The master network camera 110a processes an operation of storing in the storage medium 120 images captured by the master network camera 110a and/or the slave network cameras 110b to 110e, an operation of searching the storage medium 120 for stored image data requested by the client device 130, an operation of transmitting obtained image data to the client device 130, an operation of providing real-time images to the client device 130, and an operation of processing other client requests. That is, the master network camera 110a processes operations of storing, searching, and transmitting not only images captured by itself but also images captured by the slave network cameras 110b to 110e. Due to this configuration, the client device 130 can receive services related to the slave network cameras 110b to 110e by accessing the master network camera 110a. If the system 100 includes only one network camera, the network camera operates as a master network camera.

The network cameras 110a to 110e are capturing devices, each having a capturing function and a signal processing function, and being capable of communicating with a network in a wired or wireless manner. The network cameras 110a to 110e, for example, can be disposed in surveillance zones and monitor each surveillance zone via a security system. The network cameras 110a to 110e are connected to the client device 130 via a network. The client device 130 can read and receive image data captured by the network cameras 110a to 110e and stored in the storage medium 120 by accessing the master network camera 110a. In addition, the client device 130 can receive real-time images captured by the network cameras 110a to 110e via the master network camera 110a. To do this, the master network camera 110a may provide a web service to the client device 130. The slave network cameras 110b to 110e monitor respective surveillance zones, generate image data, and transmit the generated image data to the master network camera 110a, and the master network camera 110a stores the image data received from the slave network cameras 110b to 110e in the storage medium 120.

The storage medium 120 stores images captured by the network cameras 110a to 110e. An operation of storing image data into the storage medium 120 is controlled by the master network camera 110a. The storage medium 120 may be, for example, a Network Attached Storage (NAS), a Universal Serial Bus (USB) hard disk device, a Secure Digital (SD) card, or a flash memory connected to the master network camera 110a. In case of using a NAS, the network cameras 110a to 110e do not have to have an additional interface for communication with the storage medium 120. However, in case of using a USB hard disk device, an SD card, or a flash memory, the network cameras 110a to 110e may have to have an additional interface for communication with the storage medium 120.

The client device 130 can request captured images from the network cameras 110a to 110e or a network camera setup change from the master network camera 110a. The client device 130 may be, for example, a Personal Computer (PC) connected to the network cameras 110a to 110e and the storage medium 120 via a network. As an example, the storage medium 120 can be included in the client device 130. For example, it is possible to embody the storage medium 120 by allocating a storage space for storing images captured by the network cameras 110a to 110e to a storage medium included in the client device 130.

Figure 2:
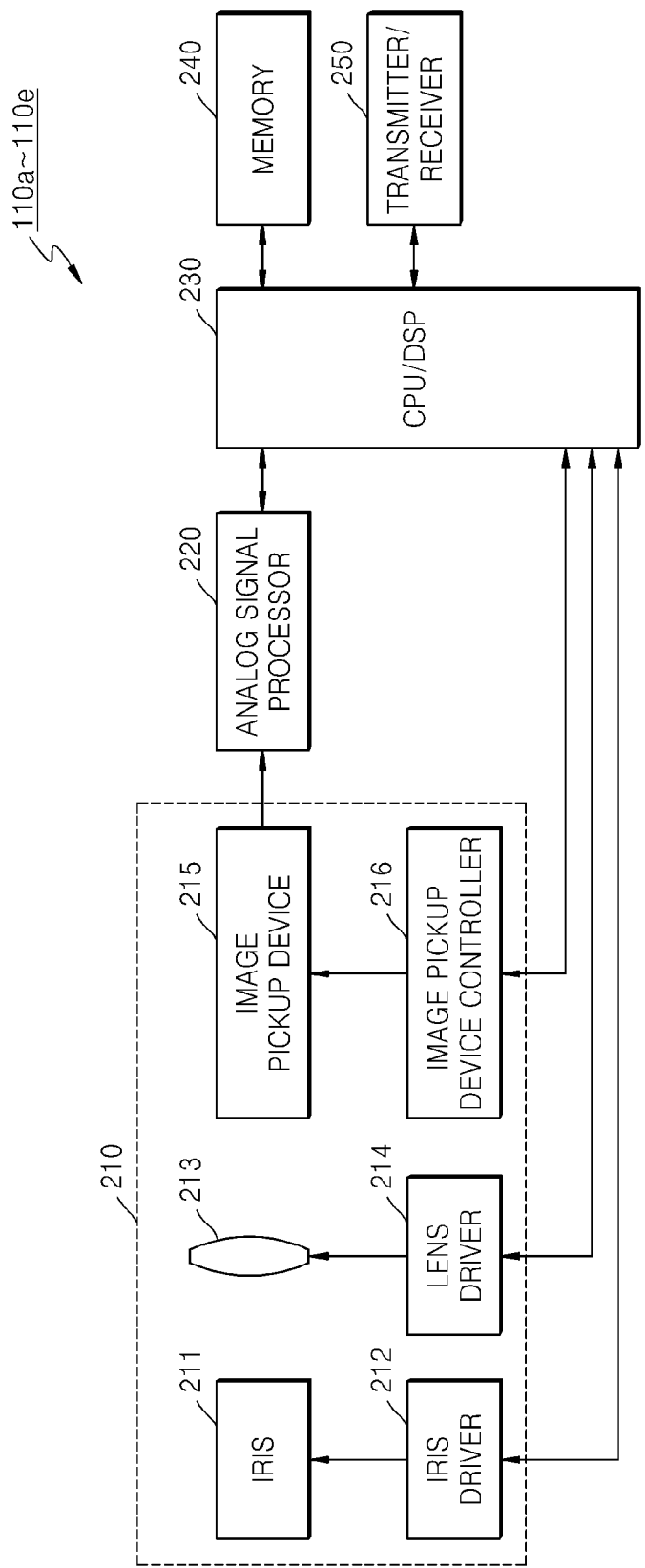
FIG. 2 is a block diagram illustrating a structure of network cameras 110a to 110e according to an exemplary embodiment.

FIG. 2 is a block diagram illustrating a structure of the network cameras 110a to 110e according to an exemplary embodiment.

Each of the network cameras 110a to 110e includes a capturing unit 210, an analog signal processor 220, a central processing unit (CPU)/digital signal processor (DSP) 230, a memory 240, and a transmitter/receiver 250. The capturing unit 210 includes an iris 211, an iris driver 212, a lens 213, a lens driver 214, an image pickup device 215, and an image pickup device controller 216.

The overall operation of the network cameras 110a to 110e is controlled by the CPU/DSP 230. The CPU/DSP 230 provides control signals to the iris driver 212, the lens driver 214, and the image pickup device controller 216 to operate the capturing unit 210.

The capturing unit 210 generates an image corresponding to an electrical signal generated in response to incident light using the iris 211, the iris driver 212, the lens 213, the lens driver 214, an image pickup device 215, and the image pickup device controller 216.

The iris driver 212 controls a degree of opening/closing of the iris 211, thereby controlling the intensity of light incident onto the image pickup device 215.

The lens 213 may include a plurality of lenses, such as a zoom lens, a focus lens, etc. A position of the lens 213 is controlled by the lens driver 214. The lens driver 214 controls a position of the lens 213 according to a control signal received from the CPU/DSP 230.

An optical signal transmitted through the iris 211 and the lens 213 makes an image of an object on a light receiving side of the image pickup device 215. The image pickup device 215 may be a charge coupled device (CCD) image sensor or a complementary metal oxide semiconductor image sensor (CIS) that converts an optical signal to an electrical signal. A sensitivity of the image pickup device 215 can be controlled by the image pickup device controller 216. The image pickup device controller 216 can control the image pickup device 215 according to a control signal automatically generated by a real-time input image signal or a control signal manually input by an operation of a user.

The analog signal processor 220 performs noise reduction processing, gain adjustment, waveform standardization, analog-digital conversion processing, etc.

A signal processed by the analog signal processor 220 may be directly input to the CPU/DSP 230 or via the memory 240. Herein, the memory 240 operates as a main memory of the network cameras 110a to 110e, and temporarily stores information that the CPU/DSP 230 requires for its operations.

The CPU/DSP 230 performs predetermined image processing on image data analog-to-digital-converted by the analog signal processor 220, and encodes the image-processed image data. The CPU/DSP 230 can reduce noise of input image data, and perform image signal processing for image quality improvement, such as Gamma correction, color filter array interpolation, color matrix, color correction, and color enhancement. In addition, the CPU/DSP 230 can generate an image file by compressing image data generated from the image signal processing for image quality improvement. The CPU/DSP 230 can generate a video file by compressing image data under the Moving Picture Experts Group (MPEG) standard. In addition, the CPU/DSP 230 can convert captured images to images in the Joint Photographic Experts Group (JPEG) format or JPEG 2000 format.

The transmitter/receiver 250 has a function of communicating with another network camera or the client device 130. The transmitter/receiver 250 can transmit image data or a control signal to another network camera or the client device 130, or receive image data or a control signal from another network camera or the client device 130.

Figure 3:
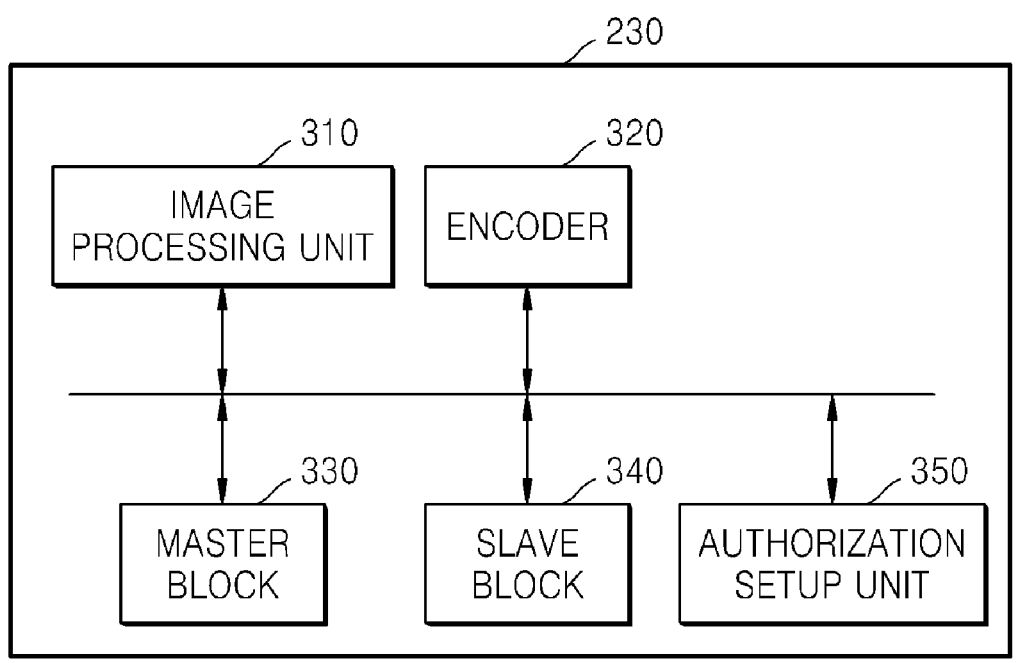
FIG. 3 is a block diagram illustrating a structure of a CPU/DSP 230 of the network cameras 110a to 110e according to an exemplary embodiment.

FIG. 3 is a block diagram illustrating a structure of the CPU/DSP 230 of the network cameras 110a to 110e according to an exemplary embodiment.

Referring to FIG. 3, the network cameras 110a to 110e can be configured similarly in terms of hardware, and operate as a master network camera or a slave network camera according to an authorization setup. The CPU/DSP 230 of the network cameras 110a to 110e can include an image processing unit 310, an encoder 320, a master block 330, a slave block 340, and an authorization setup unit 350.

The image processing unit 310 performs image signal processing for image quality improvement on image data input from the analog signal processor 220.

The encoder 320 encodes image data processed by the image processing unit 310 according to a predetermined standard. For example, the encoder 320 can encode image data to a video file according to the MPEG standard or a still image file according to the JPEG standard.

When one of the network cameras 110a to 110e including the CPU/DSP 230 operates as a master network camera, the master block 330 performs an operation of storing image data generated by the network cameras 110a to 110e to the storage medium 120, an operation of searching the storage medium 120 for stored image data requested by the client device 130, and providing obtained image data to the client device 130, an operation of providing real-time images of the network cameras 110a to 110e requested by the client device 130 to the client device 130, and an operation of processing other client requests. A structure of the master block 330 will be described in detail later.

When one of the network cameras 110a to 110e including the CPU/DSP 230 operates as a slave network camera, the slave block 340 performs an operation of transmitting image data generated by the slave network camera to a network camera operating as a master network camera 110a, and an operation of designating a new master network camera in case where an existing master network camera 110a is in an abnormal state. A structure of the slave block 340 will be described in detail later.

The authorization setup unit 350 sets authorization of a network camera including the authorization setup unit 350 to a master network camera or a slave network camera. When authorization of the network camera is set to a master network camera, the master block 330 is activated, and when authorization of the network camera is set to a slave network camera, the slave block 340 is activated. For example, for the authorization setup, various authentication algorithms can be used in the authorization setup unit 350.

Figure 4:
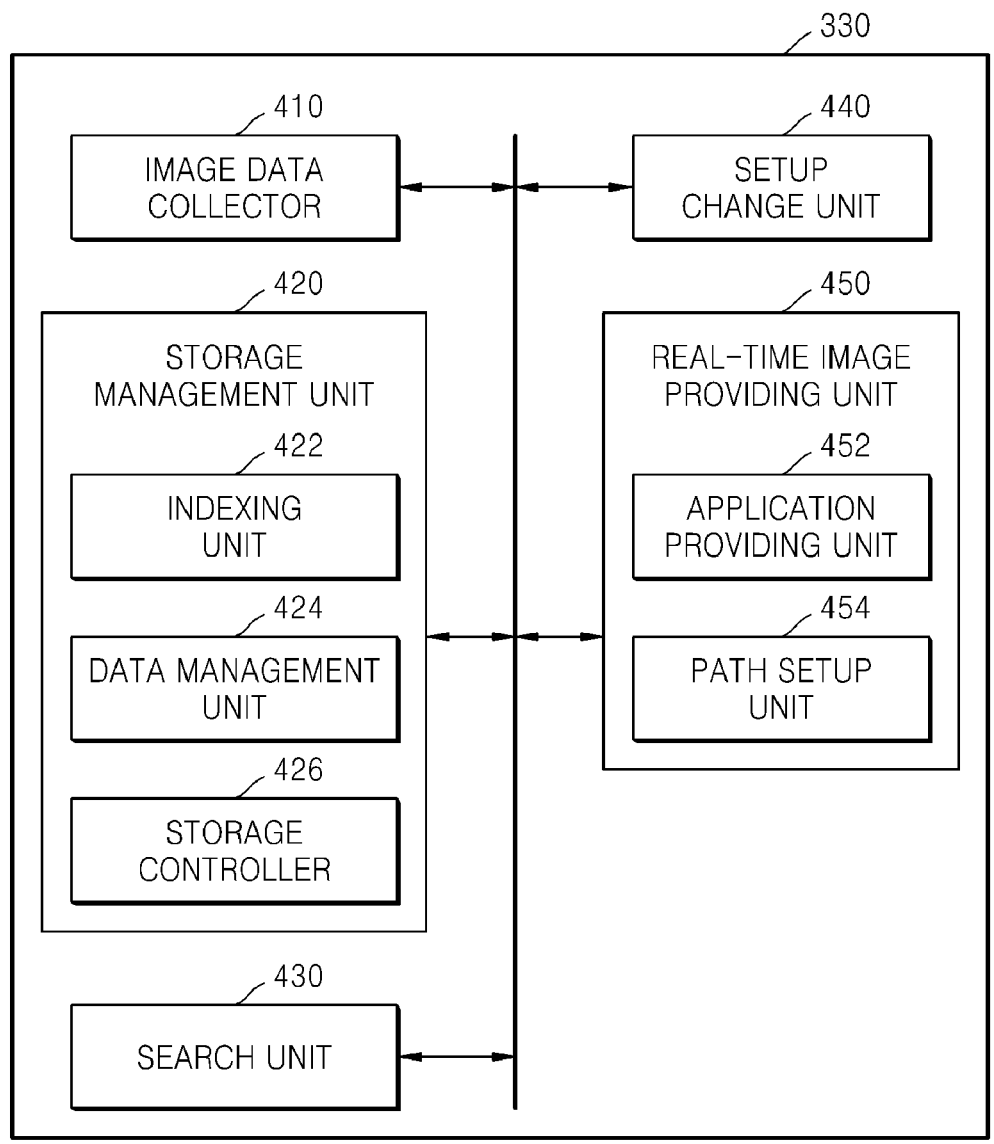
FIG. 4 is a block diagram of a master block 330 according to an exemplary embodiment.

FIG. 4 is a block diagram of the master block 330 when the network camera 110a is designated as a master network camera, according to an exemplary embodiment.

The master block 330 according to an exemplary embodiment can be configured to perform functions such as storage, search, setup change, and real-time image providing. The master block 330 can include an image data collector 410, a storage management unit 420, a search unit 430, a setup change unit 440, and a real-time image providing unit 450.

The image data collector 410 receives image data from the slave network cameras 110b to 110e via the transmitter/receiver 250. The image data received from the slave network cameras 110b to 110e can be received after encoding has been completed.

The storage management unit 420 controls an operation of storing image data of the master network camera 110a and the slave network cameras 110b to 110e to the storage medium 120. The storage management unit 420 can include an indexing unit 422, a data management unit 424, and a storage controller 426.

The indexing unit 422 allocates indexing information INDEX, such as a network camera identification and image data attribute information, to image data. The network camera identification indicates identification information of a network camera that has captured corresponding image data. The image data attribute information is information indicating an attribute of the image data, such as the date and time when the image data has been captured.

The data management unit 424 generates an indexing table for designating a location where the image data is stored in the storage medium 120 according to the indexing information by layering the indexing information.

Figure 5:
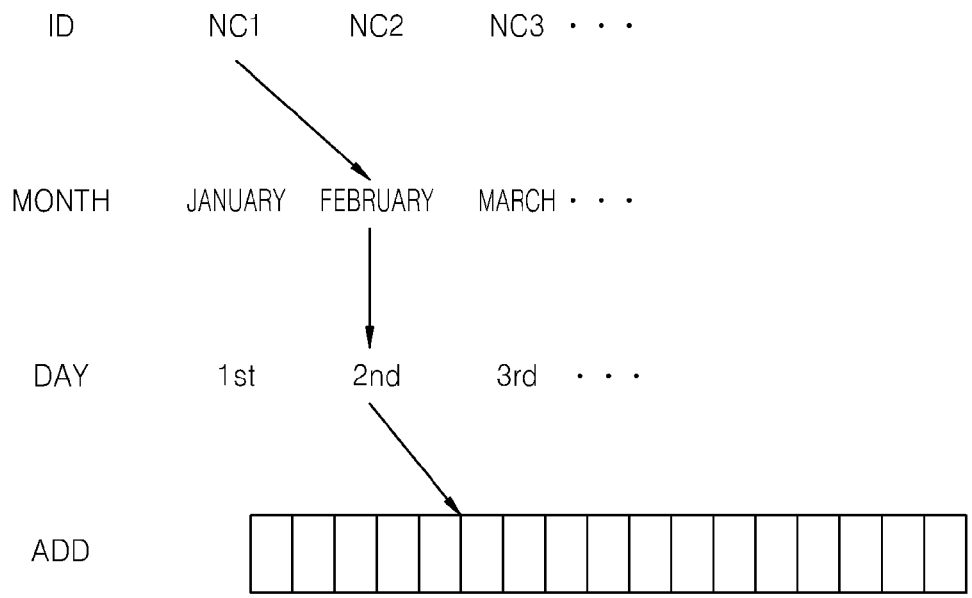
FIG. 5 illustrates the concept of an indexing table.

FIG. 5 illustrates a concept of an indexing table, according to an exemplary embodiment.

According to the exemplary embodiment, image data can be stored and managed using a floating database scheme. According to the floating database scheme, a location where image data is stored is pointed to using attribute information of the image data. For example, a location ADD of image data, i.e., an address on the storage medium 120, can be pointed to using indexing information INDEX, such as network camera identification ID, captured month MONTH, and captured date DAY. The indexing table includes information for pointing the location ADD using the indexing information.

Figure 6:
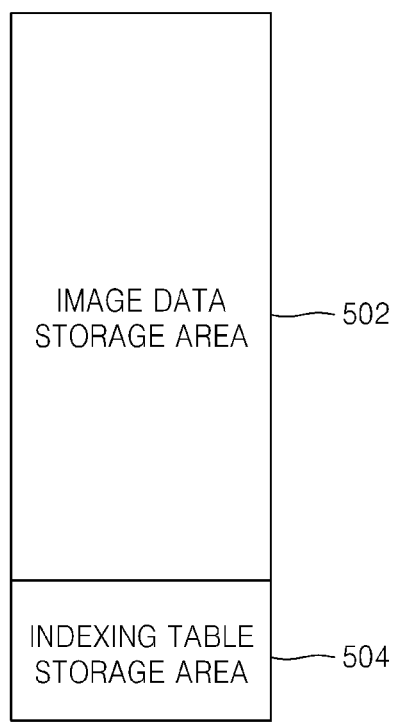
FIG. 6 is a block diagram illustrating storage space allocation of a storage medium 120 according to an exemplary embodiment.

The storage controller 426 performs an operation of recording image data and an indexing table on the storage medium 120. FIG. 6 is a block diagram illustrating storage space allocation of the storage medium 120 according to an exemplary embodiment. An image data storage area 502 and an indexing table storage area 504 can be allocated to the storage medium 120 according to the current exemplary embodiment. The storage controller 426 can store image data in the image data storage area 502 and store an indexing table in the indexing table storage area 504.

Figure 7:
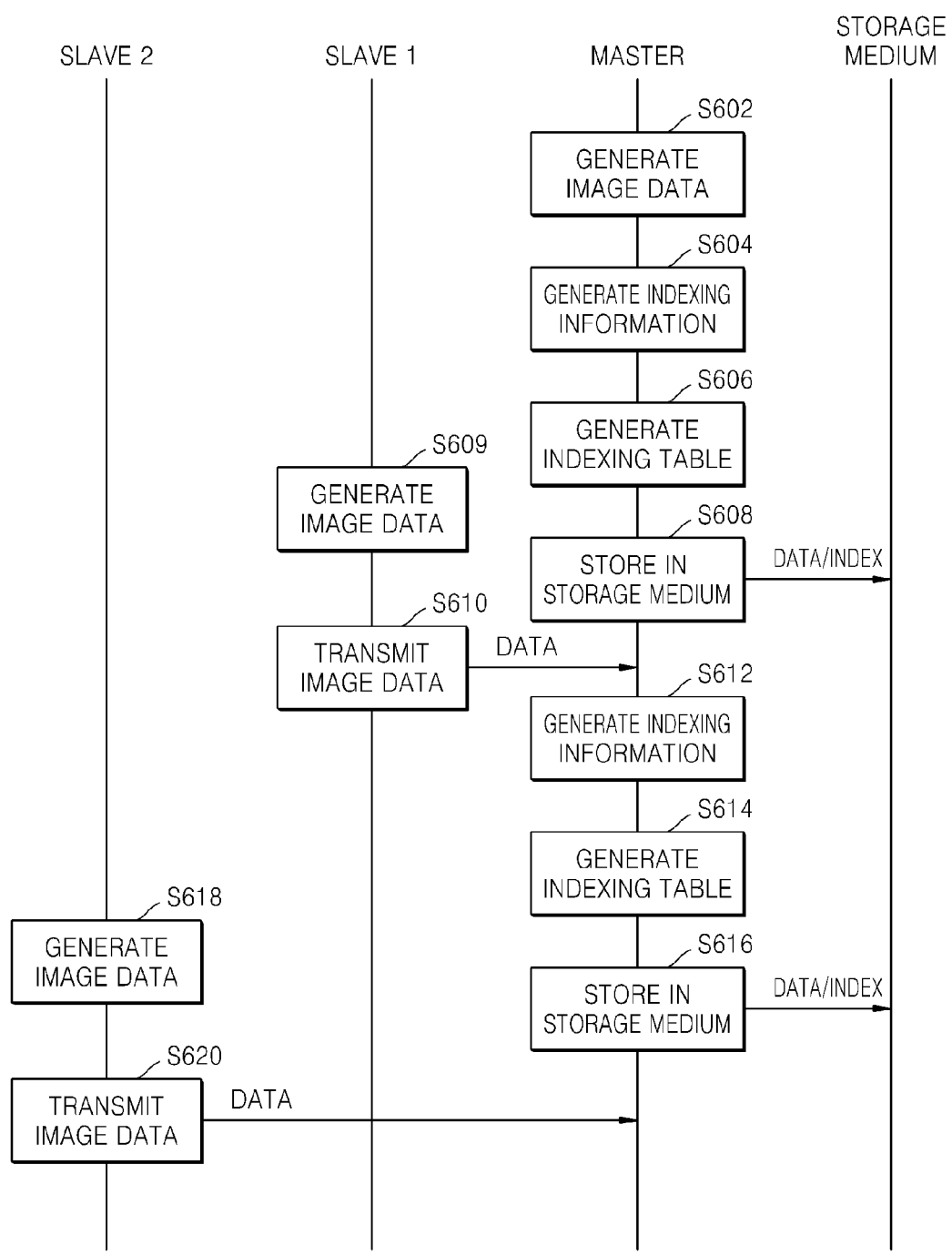
FIG. 7 is a signaling diagram illustrating a storage operation according to an exemplary embodiment.

FIG. 7 is a signaling diagram illustrating a storage operation according to an exemplary embodiment. In FIG. 7, for convenience of description, only two slave cameras SLAVE 1 and SLAVE 2 are shown.

A master network camera MASTER generates image data by performing predetermined image processing on an captured image signal and encoding the image-processed image signal in step S602. The master network camera MASTER generates indexing information on the image data in step S604 and generates an indexing table in step S606. The master network camera MASTER stores the image data DATA and the indexing information INDEX in the storage medium 120 in step S608.

In parallel with the operation of generating and storing image data in the master network camera MASTER, a first slave camera SLAVE 1 and a second slave camera SLAVE 2 generate respective image data in steps S609 and S618. The slave cameras SLAVE 1 and SLAVE 2 transmit the generated image data to the master network camera MASTER according to respectively defined sequences in steps S610 and S620. When the image data is transmitted from the first slave camera SLAVE 1 to the master network camera MASTER according to a defined sequence for the first slave camera SLAVE 1 in step S610, like the operations performed for the image data of the master network camera MASTER, operations of generating indexing information (S612), generating indexing table (S614), and storing image data and indexing table in the storage medium 120 (S616) are performed for the image data of the first slave camera SLAVE 1. According to another defined sequence for the second slave camera SLAVE 2, the image data of the second slave camera SLAVE 2 is transmitted to the master network camera MASTER in step S620, and the operations performed for the image data of the first slave camera SLAVE 1 are repeated.

The search unit 430 searches the storage medium 120 for requested stored image data and provide requested image data to the client device 130 in response to a client request for reading or transmission of image data stored in the storage medium 120. In addition, the search unit 430 can provide an application for reading or downloading stored image data to the client device 130.

Figure 8:
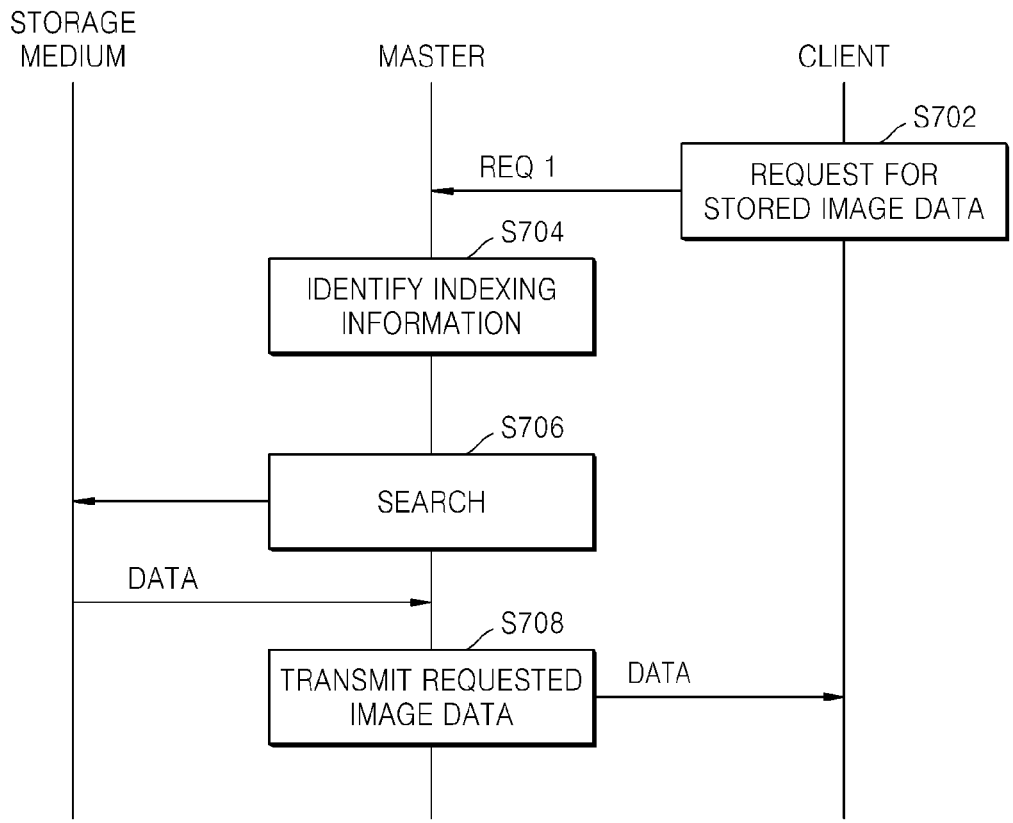
FIG. 8 is a signaling diagram illustrating a process of searching for stored image data according to an exemplary embodiment.

FIG. 8 is a signaling diagram illustrating a process of searching for stored image data according to an exemplary embodiment.

When a stored image request REQ1 requesting stored image data is received by the master network camera MASTER from the client device 130, the master network camera MASTER identifies indexing information of the stored image data, which is included in the stored image request REQ1, in step S704. That is, a network camera identification indicating which network camera captured the stored image data and attribute information indicating the month and date when the stored image data was captured are identified.

By acquiring a stored location ADD of corresponding stored image data DATA from an indexing table stored in the storage medium 120 using the indexing information identified according to the stored image request REQ1, the stored image data DATA stored in the storage medium 120 is searched for in step S706. The master network camera MASTER transmits the requested stored image data DATA to the client device 130 in step S708. For example, the stored image data DATA can be stored in the master network camera MASTER, and then, transmitted to the client device 130. As another example, the master network camera MASTER can control the storage medium 120 and the client device 130 so as for the stored image data DATA to be directly transmitted from the storage medium 120 to the client device 130 without storing the stored image data DATA in the master network camera MASTER. In this example, the direct transmission of the stored image data DATA may be performed by providing the client device 130 with location information indicating a location where the stored image data DATA is stored.

The setup change unit 440 changes settings of the network cameras 110a to 110e in response to a setup change request received from the client device 130. If the setup change request relates to the master network camera 110a, the setup change unit 440 changes a setup of the master network camera 110a, and if the setup change request relates to one of the slave network cameras 110b to 110e, the setup change unit 440 controls a corresponding slave network camera to change a setup of the corresponding slave network camera. Due to this configuration, since the client device 130 can process a setup change of every network camera by accessing the master network camera 110a, the network cameras 110a to 110e can be conveniently controlled.

The real-time image providing unit 450 provides real-time images captured by the network cameras 110a to 110e to the client device 130 in response to a client request for real-time images. The real-time image providing unit 450 includes an application providing unit 452 and a path setup unit 454 as shown in FIG. 4.

Figure 9:
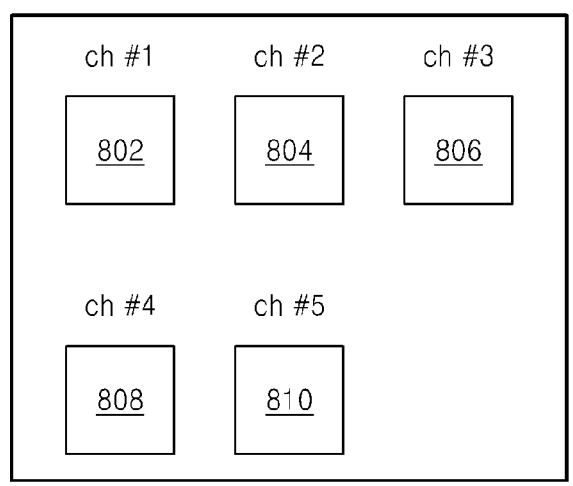
FIG. 9 illustrates an application view providing a real-time image according to an exemplary embodiment.

The application providing unit 452 provides real-time images to the client device 130 by executing a real-time image application installed thereon. FIG. 9 illustrates a view (or screen) displayed on the client device 130 when the real-time image providing application is executed. As illustrated in FIG. 9, real-time images captured by the network cameras 110a to 110e are provided through zones 802 to 810 of the view of the real-time image providing application provided by the application providing unit 452.

The path setup unit 454 allocates paths for accessing real-time images of the network cameras 110a to 110e to the zones 802 to 810 of the view of the real-time image providing application, respectively. That is, the paths of real-time images are allocated to the zones 802 to 810 as follows. A path of real-time images of the master network camera 110a is allocated to the first zone 802, a path of real-time images of the first slave network camera 110b to the second zone 804, a path of real-time images of the second slave network camera 110c to the third zone 806, a path of real-time images of the third slave network camera 110d to the fourth zone 808, and a path of real-time images of the fourth slave network camera 110e to the fifth zone 810. The client device 130 can read real-time images by accessing the paths of real-time images of the network cameras 110a to 110e via the view of the real-time image providing application in which the paths of real-time images are allocated to the respective zones.

Figure 10:
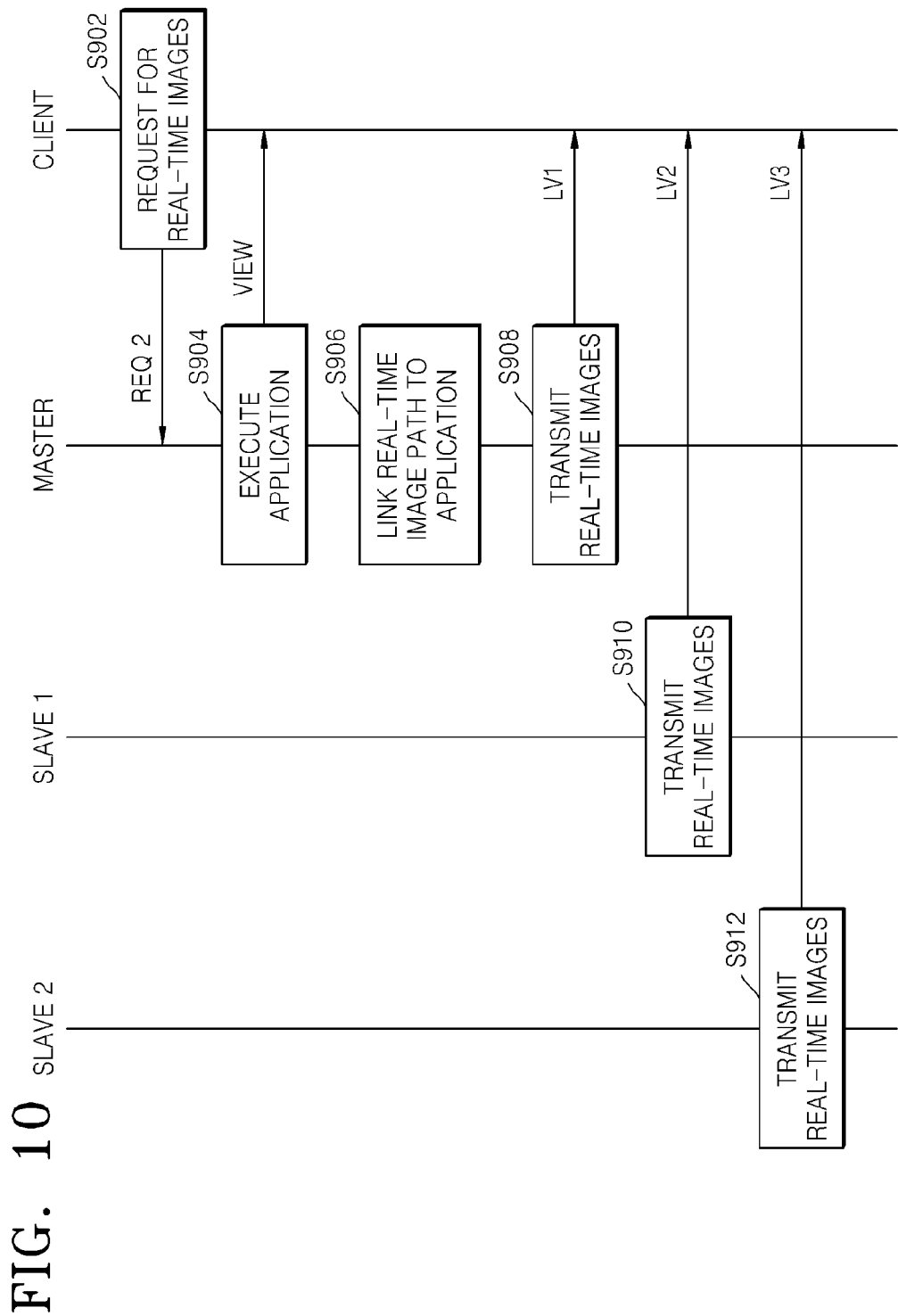
FIG. 10 is a signaling diagram illustrating an operation of providing a real-time image according to an exemplary embodiment.

FIG. 10 is a signaling diagram illustrating a real-time image providing operation according to an exemplary embodiment.

When a real-time image request REQ2 is received by the master network camera MASTER from the client device CLIENT in step S902, the master network camera MASTER executes the real-time image providing application, and provides an application view VIEW to the client device 130 in step S904. The master network camera MASTER links the paths of real-time images of the respective network cameras 110a to 110e to the respective zones of the real-time image providing application in step S906. The real-time image providing application can provide the real-time images of the network cameras 110a to 110e to the client device 130 through the VIEW by accessing the paths of real-time images in step S908. Alternatively, the master network camera MASTER can control the slave network cameras SLAVE 1 and SLAVE 2 to directly transmit real-time images thereof to the client device 130 by requesting real-time image transmission from the slave network cameras SLAVE 1 and SLAVE 2 in steps S910 and S912.

Figure 11:
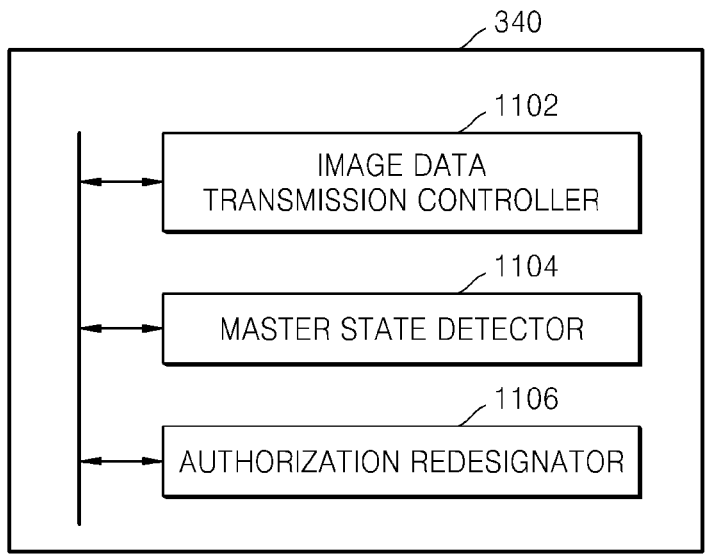
FIG. 11 is a block diagram of a slave block 340 according to an exemplary embodiment.

FIG. 11 is a block diagram of the slave block 340 according to an exemplary embodiment.

Assuming that the network cameras 110b to 110e are designated as slave network cameras, the slave network cameras 110b to 110e encode images captured by the capturing unit 210 and transmit the encoded image data to the master network camera 110a. The slave block 340 according to the current exemplary embodiment includes an image data transmission controller 1102, a master state detector 1104, and an authorization redesignator 1106.

The image data transmission controller 1102 transmits image data to the master network camera 110a via the transmitter/receiver 250. Image data of each of the slave network cameras 110b to 110e can be transmitted to the master network camera 110a via an allocated channel, and a sequence for transmitting the image data can be determined according to a pre-defined criterion.

At least one of the slave network cameras 110b to 110e according to the current exemplary embodiment detects a state of the master network camera 110a, and if the master network camera 110a is determined to be in an abnormal state, one of the slave network cameras 110b to 110e is redesignated as a new master network camera.

The master state detector 1104 detects a state of the master network camera 110a. The state of the master network camera 110a can be periodically checked by a state detection operation. Alternatively, the state of the master network camera 110a can be detected based on continuous image data transmission failure.

The authorization redesignator 1106 redesignates at least one of the slave network cameras 110b to 110e as a master network camera if the master network camera 110a is in an abnormal state. Designating the slave network camera as a master network camera can be performed according to a pre-defined criterion. For example, priorities of the slave network cameras 110b to 110e are pre-defined, and when a master network camera is to be redesignated, one of the slave network cameras 110b to 110e can be redesignated as the master network camera according to their priorities. As another example, in order to redesignate one of the slave network cameras 110b to 110e as a master network camera, authentication is issued from the authorization redesignator 1106 of each of the slave network cameras 110b to 110e, and one of the slave network cameras 110b to 110e can be redesignated as the master network camera based on the authorization of each of the slave network cameras 110b to 110e.

As another example, without the master state detector 1104 and the authorization redesignator 1106 in the slave block 340, the client device 130 can detect a state of the master network camera 110a, and if the master network camera 110a is in an abnormal state, the client device 130 can control an operation of redesignating one of the slave network cameras 110b to 110e as a master network camera.

Figure 12:
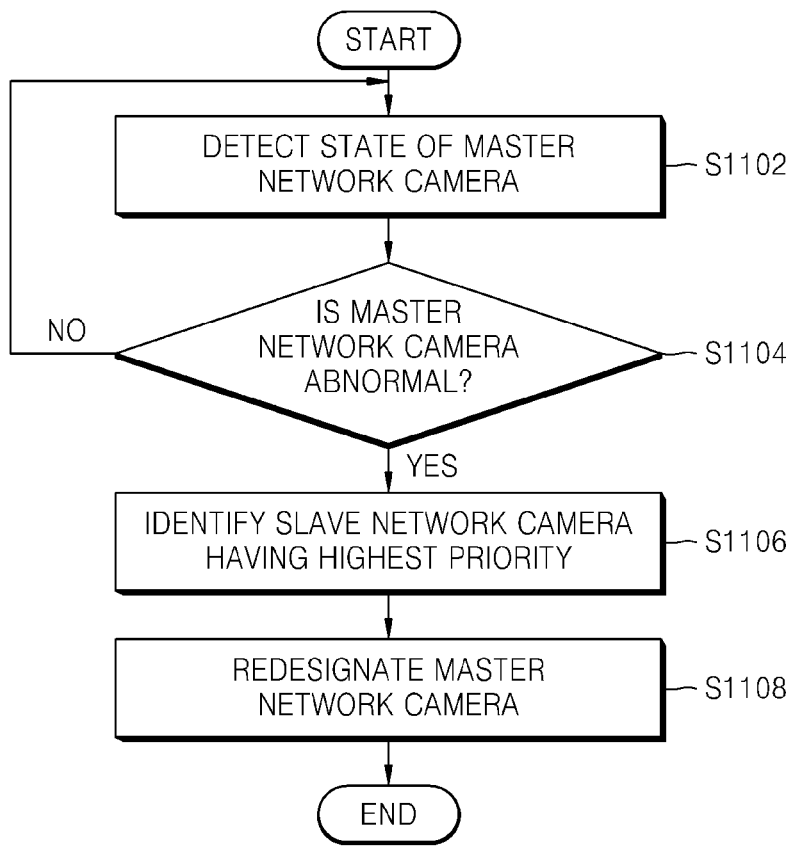
FIG. 12 is a flowchart illustrating a process of reallocating a master network camera according to an exemplary embodiment.

FIG. 12 is a flowchart illustrating a process of redesignating a master network camera according to an exemplary embodiment.

The slave network cameras 110b to 110e detect a state of the master network camera 110a in step S1102. If the master network camera 110a is in an abnormal state in step S1104, a slave network camera having the highest priority is determined from among the slave network cameras 110b to 110e in step S1106, and the slave network camera having the highest priority is redesignated as a master network camera in step S1108.

According to another exemplary embodiment, the master network camera 110a and the slave network cameras 110b to 110e can be differently configured in terms of hardware according to their respective authorities. In this case, the CPU/DSP 230 of the master network camera 110a does not have to include the slave block 340, and the slave network cameras 110b to 110e do not have to include the master block 330.

According to the present inventive concept, a system using network cameras can be configured without a network video recorder by using a network camera having storage and search functions. More particularly, by constructing a system for operating network cameras without a network video recorder in a small-sized system with a few number of network cameras, system construction costs can be remarkably reduced.

While the present inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the present inventive concept.

What is claimed is:

1. A system for operating network cameras, the system comprising:
   a plurality of network cameras which generate respective image data and are connected to a network;
   a storage medium which is connected to a first camera among the plurality of network cameras and in which the respective image data is stored; and
   a client device connected to the plurality of network cameras through the network,
   wherein the first camera generates first image data, and stores in the storage medium the respective image data generated by the plurality of network cameras,
   wherein the first camera is a master camera which receives control signals from the client device through the network to control the plurality of network cameras, and
   wherein the first camera receives a request of image data stored in the storage medium from the client device, and, in response to the request, provides the client device with information about a location of the requested image data in the storage medium, so that the requested image data is provided to the client device without passing through the first camera.

2. The system of claim 1, wherein the plurality of network cameras except the first camera are at least one slave camera which generates second image data and transmits the second image data to the first camera, and
   the first camera comprises a storage management unit which stores the first and second image data in the storage medium.

3. The system of claim 2, wherein the first camera further comprises a search unit which searches the storage medium for requested image data stored in the storage medium and provides the requested image data to the client device in response to a request received from the client device, wherein the requested image data is one of the first and second image data.

4. The system of claim 2, wherein the first camera further comprises a setup change unit which controls one of the at least one network camera to change its setup information in response to a request received from the client device.

5. The system of claim 2, wherein the first camera further comprises a real-time image providing unit which provides the client device with real-time image data generated by the first camera and the slave camera for display of the real-time image data at the client device, in response to a request received from the client device.

6. The system of claim 2, wherein the slave camera comprises an image data transmission controller which transmits the second image data to the first camera.

7. The system of claim 2, wherein the slave camera comprises:
   a master state detector which detects a state of the first camera; and
   an authorization redesignator which designates one of the plurality of network cameras except the first camera as a new master camera which receives the control signals from the client device to control the plurality of network cameras if the first camera is determined to be in an abnormal state, and
   wherein the designated camera generates stores in the storage medium the respective image data generated by the plurality of network cameras.

8. The system of claim 1, wherein the storage medium is connected to the first camera and is at least one of a network attached storage (NAS), a universal serial bus (USB) hard disk device, a secure digital (SD) card, and a flash memory.

9. A method for operating a plurality of network cameras connected to a network, the method comprising:
   designating a first camera of the plurality of network cameras as a master camera which receives control signals from a client device connected to the plurality of network cameras through the network to control the plurality of network cameras;
   designating the plurality of network cameras except the first camera as a slave camera;
   storing, by the first camera, first image data generated by the first camera and second image data generated by the slave camera in a storage medium connected to the first camera;
   receiving, by the first camera, a request of image data stored in the storage medium from the client device; and
   in response to the request, providing, by the first camera, the client device with information about a location of the requested image data in the storage medium, so that the requested image data is provided to the client device without passing through the first camera.

10. The method of claim 9, further comprising:
    receiving, by the first camera, a request to provide requested image data which is stored in the storage medium;
    searching, by the first camera, the storage medium for the requested image data; and
    providing, by the first camera, the requested image data to the client device.

11. The method of claim 9, further comprising:
    receiving, by the first camera, a request to change setup information of one of the plurality of network cameras; and
    controlling, by the first camera, the one of the plurality of network cameras to change its setup information.

12. The method of claim 9, further comprising:
receiving, by the first camera, a request to provide the client device with real-time image data generated by the first camera and the slave camera; and
providing, by the first camera, the received real-time image data to the client device for display at the client device.

13. The method of claim 9, further comprising:
detecting a state of the first camera; and
designating one of the plurality of network cameras except the first camera as a new master camera which receives control signals from the client device to control the plurality of network cameras if the first camera is determined to be in an abnormal state,
wherein the designated camera generates stores in the storage medium the respective image data generated by the plurality of network cameras.

14. A network camera, which generates first image data and is connected to a network, the network camera being connected to at least one other network camera generating second image data, a client device via the network, and a storage medium, the network camera comprising:
a storage management unit which stores the first image data and the second image data in the storage medium; and
a search unit which performs at least one of:
searching the storage medium for requested image data and provides the requested image data to the client device in response to a client request received from the client device; and
providing the client device with information about a location of the requested image data in the storage medium, so that the requested image data is provided to the client device without passing through the network camera.

15. The network camera of claim 14, further comprising a setup change unit which controls one of the network camera and the at least one other network camera to change its setup information in response to a request received from the client device.

16. The network camera of claim 14, further comprising a real-time image providing unit which provides the client device with real-time image data generated by the network camera and the at least one other network camera in response to a request from the client to request the real-time image data.

17. The network camera of claim 16, wherein the real-time image providing unit comprises:
an application providing unit which provides an application to the client device so that images corresponding to the real-time image data are displayed at the client device through the application; and
a path setup unit that links to the application a real-time image providing path of each of the network camera and the at least one other network camera of which the real-time image data has been requested.

18. The network camera of claim 14, further comprising an image data collector which receives the second image data from the at least one other network camera.

19. The network camera of claim 14 wherein the storage management unit comprises:
an indexing unit which allocates respective identifications to the first image data and the second image data with respect to the network camera and the at least one other network camera, respectively;
a data management unit which generates an indexing table indicating respective locations of the first image data and the second image data in the storage medium according to the respective identifications and respective attribute information of the first image data and the second image data; and
a storage controller which controls storing the respective identification and attribute information along with the first image data and the second image data in the storage medium.

20. A network camera, which generates image data and is connected to a master camera and at least one slave camera via a network, the network camera comprising:
an image data transmission controller which transmits the image data to the master camera,
wherein the master camera stores the image data in a storage medium connected to the master camera, and
wherein the master camera receives a request of the image data stored in the storage medium from a client device, and, in response to the request, provides the client device with information about a location of the requested image data in the storage medium, so that the requested image data is provided to the client device without passing through the master camera.

21. The network camera of claim 20, further comprising:
a master state detector which detects a state of the master camera; and
an authorization redesignator which designates one of the network camera and the at least one slave camera as a new master camera which receives control signals from a client device connected to the network camera, the master camera and the at least one slave camera through the network to control the network camera, the master camera and the at least one slave camera if the master camera is determined to be in an abnormal state.

22. A network camera, which generates first image data and is connected to at least one other network camera generating second image data, a client device and a storage medium via a network, the network camera comprising:
a master block performing a first function comprising receiving the second image data from the at least one other network camera, storing the first image data and the second image data in the storage medium, and searching the storage medium for requested image data and providing the requested image data to the client device in response to a request received from the client device;
a slave block performing a second function of transmitting the first image data generated by the network camera to one of the at least one other network camera; and
an authorization setup unit which sets the network camera as a master camera or a slave camera, activates the master block to perform the first function if the network camera is set as the master camera, and activates the slave block to perform the second function if the network camera is set as the slave camera,
wherein if the master block receives a request of image data stored in the storage medium from the client device, the master block provides the client device with information about a location of the requested image data in the storage medium, so that the requested image data is provided to the client device without passing through the master block.

23. The network camera of claim 22, wherein the slave block comprises:

an image data transmission controller which transmits the first image data to a first camera among the at least one other network camera set as the master camera which receives control signals from the client device to control the network camera and the at least one other network camera;

a master state detector which detects a state of the first camera; and an authorization redesignator which designates one of the network camera and the at least one other network camera except the first camera if the first camera is determined to be in an abnormal state.

* * * * *